3,328,478
PRODUCTION OF CONJUGATED DIOLEFINES BY OXIDATIVE DEHYDROGENATION
John Lynn Barclay, Tadworth, and David James Hadley, Epsom Downs, England, assignors to The Distillers Company Limited, Edinburgh, Scotland, a British company
No Drawing. Filed Apr. 11, 1961, Ser. No. 102,106
Claims priority, application Great Britain, Apr. 26, 1960, 14,520/60
11 Claims. (Cl. 260—680)

This invention relates to the preparation of conjugated diolefines from olefines.

According to the present invention the process for the production of a conjugated diolefine comprises reacting a mono-olefine, the molecule of which contains a chain of not less than four carbon atoms, in the vapour phase with molecular oxygen over a catalyst comprising antimony oxide at an elevated temperature.

The antimony oxide catalyst may be derived from an antimony compound which is partially or completely converted under the reaction conditions to an oxide of antimony. The catalyst may consist of antimony oxide alone or antimony in combination with a least one polyvalent metal oxide such as an oxide of tin, molybdenum, tungsten, and/or titanium. Such catalysts may be regarded either as mixtures of the oxides of antimony and the polyvalent metal, or as compounds of antimony with the other metal and oxygen, i.e. antimony molybdate or antimony tungstate. Under the reaction conditions the catalyst may be present in either or both forms. Such catalysts may be prepared, for instance, by intimately mixing antimony oxide or hydroxide with the other metal oxide or hydroxide. Alternatively the catalyst may be prepared by precipitation, for instance by adding an aqueous solution of an antimony salt to an aqueous solution or suspension of molybdic acid or a molybdic acid salt, and recovering the resulting precipitate.

The activity of the antimony oxide catalysts is frequently improved by a prior heat-treatment, for instance at a temperature between 500° and 1100° C.

An outstandingly good catalyst comprises (i) a mixture of the oxides of antimony and tin, and/or (ii) a compound of antimony, tin, and oxygen, i.e. tin antimonate; under the reaction conditions the catalyst may be present in either or both forms. The catalytic composition may be prepared in any suitable manner, for instance from the oxides of antimony and tin, or from compounds of tin or antimony which on heating in the presence of an oxygen-containing gas, such as air, are converted to the oxides. Any of the oxides of antimony and tin or substances yielding these oxides, may be used in the manufacture of the catalytic composition, such as antimony trioxide, antimony tetroxide, antimony pentoxide or mixtures of such oxides; stannic oxide, stannous oxide, meta-stannic acid or mixtures of such oxides. Hydrated forms of these oxides may also be used, for instance such as are formed by the action of aqueous nitric acid on antimony or tin metals or on mixtures of the metals. We have found that particularly good catalysts are those in which antimony tetroxide is associated, either as a mixture or in combination, with stannic oxide.

The atomc ratio of tin to antimony in the catalytic composition may vary within moderately wide limits, for instance between 0.1:1 and 20:1, although compositions containing proportions of tin to antimony outside this range may be useful for some purposes. Though the catalytic composition prepared as described above can be used as such, it is sometimes advantageous to subject it to a prior heat-treatment in the presence of an oxygen-containing gas such as air, for instance at a temperature between 550° and 1100° C.

A particularly preferred method of preparing the antimony oxide/tin oxide catalytic composition comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550° to 1100° C.

Another preferred method of preparing the antimony oxide/tin oxide catalytic composition comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the composition may be prepared in this way. Particularly useful catalytic compositions can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e. as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C. A convenient way of doing this is to heat pellets of the catalyst in a furnace, the temperature of which is raised from about 300° to about 650° C. over a period of not less than 8 hours, while passing a stream of air over the catalyst. After this preliminary heat-treatment, the mixture is then subjected to a final heat-treatment in air at a temperaure in the range 550° to 1100° C.

The catalytic composition of the present invention may, if desired, be deposited on a support such as silica.

By whichever method the oxides or hydrated oxides have been prepared, the mechanical stability of the catalyst is enhanced by washing, preferably with water, before drying.

In the process of this invention, a mono-olefine, whose formula contains a chain of not less than four carbon atoms, in admixture with a free-oxygen containing gas, is brought into contact with the catalyst in any suitable manner, for example in a fixed bed reactor or in a fluidised bed reactor. The proportion of mono-olefine in the feed may vary within fairly wide limits, but it is preferred to operate within the range 1% to 25% by volume. It is preferred to use butene, 2-methylbutene-1 or 2-methylbutene-2 as olefine starting materials in the process, butene being converted to butadiene and the methylbutenes to isoprene.

The concentration of oxygen in the reaction mixture may vary within fairly wide limits, but it is preferred to operate with an oxygen concentration between 1% and 21% by volume of the reaction mixture. The feed also contains a diluent which is preferably substantially inert under the conditions of the reaction, and which may be, for example, nitrogen or steam. It is preferred to use a mixture of nitrogen and steam as diluent, and the oxygen may thus conveniently be supplied in the form of air.

The reaction is preferably carried out at a temperature below 500° C., and particularly in the range 200° C.–500° C. The contact time may be, for example, within the range 1–30 seconds. The reaction may be carried out at atmospheric pressure, subatmospheric pressure or superatmospheric pressure.

The conjugated diolefines formed in reactions according to this invention may be recovered by any suitable means, for example by extraction into an organic solvent, or by condensation, if necessary with freezing, and fractionation of the product.

The process of the invention is further illustrated by the following examples, in which parts by weight and parts by volume bear the same relation to each other as do grams to millilitres.

*Example 1*

120 parts by weight of powdered tin metal were slowly added to a well stirred solution of 719 parts by weight of nitric acid (specific gravity 1.42) in 2024 parts by weight of water. During the addition of the tin the acid was maintained at its boiling point.

30.8 parts by weight of powdered antimony metal were added to 179 parts by weight of nitric acid (specific gravity 1.42) at 60–70° C. with stirring.

The two acid mixtures were boiled with stirring until they ceased to evolve nitrous fumes, whereupon the hydrated antimony oxide suspension was added to the tin mixture and stirred for several minutes. The mixture was filtered, washed with distilled water, reslurried with distilled water and added to 1710 parts by weight of silica gel containing 48 parts by weight of silica. The mixture was stirred for five minutes, filtered, dried at 90° C. for 16 hours and formed into tablets with the addition of 4% graphite. The tablets were heated at 600° C. for 16 hours and finally at 800° C. for 16 hours in air.

The catalyst so produced was placed in a reactor maintained at 350° C. and a mixture of 2% by volume of butene-2 and 98% by volume of air was passed over it; the contact time was four seconds.

Of the butene-2 fed 48.5% was converted to butadiene and 9.4% to carbon dioxide. The yield of butadiene based on the butene-2-consumed was 66%.

*Example 2*

100 parts by weight of powdered tin metal were slowly added to a well stirred solution of 600 parts by weight of nitric acid (S.G.=1.42) in 1700 parts by weight of water. During the addition the acid was maintained at its boiling point.

6.4 parts by weight of powdered antimony metal were added to 568 parts by weight of nitric acid (S.G.=1.42) at 60°–70° C. with stirring. Both of the above acid mixture were boiled with stirring until no more nitrogen oxide fumes were evolved, whereupon the hydrated antimony oxide suspension was added to the tin mixture and stirred for several minutes. The mixture was filtered and the solid product washed with distilled water, dried and pelleted in admixture with 2% by weight of graphite. The catalyst was heated in air at 750° C. for 16 hours and then at 1000° C. for 16 hours. The catalyst contained tin and antimony in the atomic ratio of 16:1.

A mixture of, by volume 5.0% of 2-methylbutene-2, 9.9% of oxygen, 40.2% of steam and 44.9% of nitrogen was passed over the catalyst in a reactor maintained at 380° C. The contact time was 4 seconds.

Of the 2-methylbutene-2 fed to the reactor, 40% was converted to isoprene, 7.8% to 2-methylbutene-1 and 25% was recovered.

*Example 3*

120 parts by weight of powdered tin metal were slowly added to a well stirred solution of 710 parts by weight of nitric acid (S.G. 1.42) in 2000 parts by weight of water. During the addition the acid was maintained at its boiling point.

493 parts by weight of powdered antimony metal were added to 2840 parts by weight of nitric acid (S.G. 1.42) at 60°–70° C. with stirring. Both of the above acid mixtures were boiled, with stirring until no more nitrous fumes were evolved, whereupon the hydrated antimony oxide suspension was added to the tin mixture and stirred for several minutes. The mixture was filtered, and the solid product was washed with distilled water, dried and pelleted in admixture with 2% by weight of graphite.

This catalyst was heated at 725° C. for 16 hours in a stream of air, the temperature being raised slowly to this value so that no part of the catalyst bed was heated above 725° C. at any time. The catalyst was finally heated at 900° C. for 16 hours. The catalyst contained tin and antimony in the atomic ratio of 1:4.

The mixture of, by volume, 5.6% of 2-methylbutene-2, 10.1% of oxygen, 44.6% by volume of nitrogen and 39.7% by volume of steam, was passed over a bed of the catalyst in a reactor at 400° C. The contact time was 4 seconds.

Of the 2-methylbutene-2 fed to the reactor, 35% was converted to isoprene, 7% to 2-methylbutene-1 and 42% was recovered.

*Example 4*

A tin antimonate catalyst having an atomic ratio of tin to antimony of 1:4 was prepared as described in Example 3 except that it was finally heated at 800° C. in air for 16 hours.

A mixture of, by volume, 9.9% of butene-2, 50% of air and 40.1% of steam, was passed over the bed of catalyst in a reactor at 440° C. The contact time was 4 seconds.

Of the butene-2 fed to the reactor, 63% was converted to butadiene and 30% was recovered.

*Example 5*

A similar catalyst to that used in Example 4 was prepared except that after heat-treatment at 725° C. it was not subjected to a subsequent final heat-treatment.

A mixture of, by volume, 10.1% of butene-2 49.9% of air and 40% of steam, was passed over the bed of catalyst in a reactor at 440° C. The contact time was 4 seconds.

Of the butene-2 fed to the reactor 51% was converted to butadiene and 40% was recovered.

*Example 6*

A similar catalyst to that used in Example 1 was prepared except that it was subjected to a heat-treatment of 725° C. for 16 hours and a final heat-treatment at 900° C. for a further 16 hours.

A mixture of, by volume, 9.8% of 2-methyl butene-2, 10.6% of oxygen, 40.2% of nitrogen and 39.4% of steam, was passed over the bed of catalyst in a reactor at 400° C. The contact time was 4 seconds.

Of the 2-methylbutene-2 fed to the reactor 30.6% was converted to isoprene, 8.4% to 2-methylbutene-1 and 42.7% was recovered.

*Example 7*

A similar catalyst to that used in Example 2 was prepared except that it was given a final heat-treatment at 875° C. for 16 hours.

In order to examine the conversion of butene to butadiene using a mixture containing, by volume, 10% of mixed butenes (butene-1 and butene-2), 40% of steam and 50% of air, this mixture was passed over the catalyst bed in a reactor operated under various conditions as indicated in the table below:

| Run | Contact time, secs. | Catalyst bed temperature, ° C. | Yield of butadiene based on butenes fed, percent | Yield of butadiene based on butenes consumed, percent |
|---|---|---|---|---|
| 1 | 4 | 350 | 44.4 | 94.3 |
| 2 | 6 | 370 | 65.5 | 88.5 |
| 3 | 6 | 395 | 67.8 | 82.8 |

*Example 8*

A catalyst containing antimony and molybdenum was prepared by mixing antimony pentoxide and molybdic oxide in proportions to give an atomic ratio of antimony to molybdenum of 2:1 and subsequently pelleting and heat treating the mixture at 540° C. for 16 hours.

A mixture of, by volume, 10% of isopentene, 50% of air, and 40% of steam was passed over a bed of the catalyst in a reactor at 400° C. The contact time was 3.6 seconds.

Of the isopentene fed to the reactor, 19% was converted to isoprene. The yield of isoprene based on the isopentene consumed was 34%.

*Example 9*

A catalyst containing antimony and tungsten was prepared by mixing antimony pentoxide and tungstic acid in proportions to give an equal atomic ratio of antimony and tungsten and subsequently pelleting and heat treating the mixture at 500° C. for 16 hours.

A mixture of, by volume, 10% of isopentene, 50% of air and 40% of steam was passed over a bed of the catalyst in a reactor at 400° C. The contact time was 3.6 seconds.

Of the isopentene fed to the reactor, 20% was converted to isoprene. The yield of isoprene based on the isopentene consumed was 54%.

*Example 10*

A similar catalyst to that used in Example 9 was prepared.

A mixture of, by volume, 10% of butene-2, 50% of air and 40% of steam was passed over a bed of the catalyst in a reactor at 490° C. The contact time was 4 seconds.

Of the butene-2 fed to the reactor, 35% was converted to butadiene. The yield of butadiene based on the butene-2 consumed was 76%.

We claim:

1. A process for producing a conjugated diolefine which comprises contacting a vapor feed mixture consisting essentially of oxygen and a monolefine containing a straight chain of not less than four carbon atoms with a catalyst comprising antimony oxide and tin oxide at an elevated temperature.

2. A process according to claim 1 wherein the monolefine is butene, 2-methyl butene-1, or 2-methyl butene-2.

3. A process as claimed in claim 2 carried out in the presence of an inert diluent.

4. A process as claimed in claim 2 wherein the atomic ratio of tin to antimony in the catalyst is between 0.1:1 and 20:1.

5. A process as claimed in claim 2 wherein the proportion of mono-olefine in the feed is within the range 1–25% by volume.

6. A process as claimed in claim 2 wherein the concentration of oxygen in the reaction mixture is between 1 and 21% by volume.

7. A process as claimed in claim 2 carried out at a temperature in the range 200°–500° C.

8. A process according to claim 2 wherein the contact time is within the range 1–30 seconds.

9. The method of claim 8 wherein the elevated temperature is within the range of 200° C. to 500° C., the monolefine constitutes from 1 to 25% by volume of the vapor feed mixture and the oxygen constitutes from 1 to 21% by volume of the vapor feed mixture.

10. A process for producing a conjugated diolefine which comprises contacting a vapor feed mixture consisting essentially of oxygen and a monolefine containing a straight chain of not less than four carbon atoms with a catalyst consisting of antimony oxide at an elevated temperature.

11. A process for the oxidative dehydrogenation of a monoolefin containing a straight chain of at least four carbon atoms to its corresponding diolefin which comprises passing a vaporous mixture consisting essentially of said monoolefin and oxygen over a catalyst consisting essentially of a mixture of antimony oxide and tin oxide at an elevated temperature.

References Cited

UNITED STATES PATENTS

| 1,975,476 | 10/1934 | Pier et al. | 252—456 |
| 2,783,185 | 2/1957 | Hughes et al. | 252—456 |
| 2,945,900 | 7/1960 | Alexander et al. | 260—669 |
| 2,991,321 | 7/1961 | Voge et al. | 260—680 |
| 3,080,435 | 3/1963 | Nager | 260—680 |
| 3,094,565 | 6/1963 | Bethell et al. | 252—461 |
| 3,159,688 | 12/1964 | Jennings et al. | 260—680 |
| 3,207,806 | 9/1965 | Bajars | 260—680 |
| 3,207,807 | 9/1965 | Bajars et al. | 260—680 |
| 3,207,810 | 9/1965 | Bajars | 260—680 |

FOREIGN PATENTS

| 1,248,370 | 10/1960 | France. |

PAUL M. COUGHLAN, Jr., *Primary Examiner.*

ALPHONSO D. SULLIVAN, JOSEPH R. LIBERMAN,
*Examiners.*